United States Patent [19]

Sanada

[11] Patent Number: 5,561,587
[45] Date of Patent: Oct. 1, 1996

[54] CONDUCTIVE PASTE AND MULTILAYER CERAMIC CAPACITOR

[75] Inventor: Tomoki Sanada, Kyoto, Japan

[73] Assignee: Murata Manufacturing Co., Ltd., Japan

[21] Appl. No.: 353,559

[22] Filed: Dec. 9, 1994

[30] Foreign Application Priority Data

Dec. 10, 1993 [JP] Japan .................. 5-310558

[51] Int. Cl.$^6$ .............. H01G 4/008; H01G 4/30
[52] U.S. Cl. .............. 361/306.1; 361/306.3; 361/309; 361/313; 361/320; 361/321.1; 361/321.5
[58] Field of Search .............. 361/306.1, 298.4, 361/298.1, 298.2, 298.3, 303, 306.3, 313, 306.1, 309–312, 320–321.5, 321.1–321.2; 204/280, 296, 291–298; 429/209, 213, 217

[56] References Cited

U.S. PATENT DOCUMENTS

| | | | |
|---|---|---|---|
| 4,228,482 | 10/1980 | Bouchard | 361/313 |
| 4,446,059 | 5/1984 | Eustice | 252/514 |
| 4,521,329 | 6/1985 | Siuta et al. | 252/512 |
| 4,598,037 | 7/1986 | Felten | 430/281 |
| 4,603,007 | 7/1986 | Shibata et al. | 252/514 |
| 4,695,403 | 9/1987 | Nishimura et al. | 252/513 |
| 4,810,420 | 3/1989 | Prabhu et al. | 252/512 |
| 4,894,184 | 1/1990 | Fukuoka et al. | 252/512 |
| 4,985,376 | 1/1991 | Sunahara et al. | 501/22 |
| 5,066,620 | 11/1991 | Sunahara et al. | 501/21 |
| 5,176,853 | 1/1993 | Sarma et al. | 252/512 |

FOREIGN PATENT DOCUMENTS

| | | | |
|---|---|---|---|
| 2-22806 | 1/1990 | Japan | 361/313 |
| 2-39411 | 2/1990 | Japan | 361/306.1 |
| 2-109314 | 4/1990 | Japan | 361/311 |
| 5-291075 | 4/1992 | Japan . | |
| 5-291076 | 4/1992 | Japan . | |

OTHER PUBLICATIONS

Great Britain Search Report dated Mar. 24, 1995.

*Primary Examiner*—Gerald P. Tolin
*Assistant Examiner*—Anthony Dinkins
*Attorney, Agent, or Firm*—Ostrolenk, Faber, Gerb & Soffen, LLP

[57] ABSTRACT

A conductive paste for producing an external electrode of a ceramic chip part and a multilayer ceramic capacitor having an external electrode produced by using the conductive paste, the conductive paste comprising powder of a conductive material, a glass frit, and an organic vehicle, the glass frit containing PbO, $B_2O_3$, and $SiO_2$ as major components and further containing from 1 to 20 wt % of at least one of $TiO_2$ and $Al_2O_3$.

16 Claims, 3 Drawing Sheets

CONDUCTIVE PASTE AND MULTILAYER CERAMIC CAPACITOR

FIELD OF THE INVENTION

The present invention relates to a conductive paste for preparing an external electrode of a ceramic chip part. The present invention also relates to a ceramic chip part produced by using the conductive paste.

BACKGROUND OF THE INVENTION

External electrodes of a ceramic chip part are generally produced by the following process: Powder of a conductive material, e.g., silver (Ag), and powder of a glass frit are dispersed in an organic vehicle comprising an organic solvent and a binder resin dissolved therein to thereby prepare a conductive paste. The conductive paste is then applied to a ceramic chip body comprising internal electrode layers separated by dielectric ceramic layers. The applied conductive paste is dried, and then baked to remove the organic substances contained therein to thereby form a conductive film composed of the conductive material and the glass frit. A film of nickel (Ni) and a film of either tin (Sn) or solder are then formed successively on the conductive film by plating to thereby form an external electrode.

In the above process, lead glass, zinc glass, borosilicate glass and the like are used as the glass frit contained in the conductive paste.

In the conventional production process of an external electrode, however, problems have frequently arisen because of the penetration of a plating liquid into the ceramic chip body during the plating step after the baking of the conductive paste. Specifically, the multilayer chip part has problems, for example, that it has internal defects such as delamination and cracks, that the external electrode of the chip part has a reduced adhesion strength, and that after the chip part is mounted on a circuit board substrate, it is apt to suffer breakage due to warpage of the circuit board.

In order to overcome these problems, investigations have been made on techniques for inhibiting the penetration of a plating liquid into a ceramic chip body by increasing the amount of the glass frit contained in a conductive paste or by employing a glass frit having a high melting point which is chemically stable.

However, the recently developed ceramic chip parts produced by using lead oxide series materials, e.g., high-capacitance, small, multilayer ceramic capacitors with excellent bias properties, have the following problem: The ceramic material employed in such a capacitor is highly reactive to the glass frit. Hence, although a conductive paste containing the glass frit having a high melting point is applied and baked, the ceramic material is denatured by reaction with the glass frit. As a result, not only the intended capacitor properties previously attained are lost, but also the plating liquid is liable to penetrate into the resulting ceramic chip body to cause deterioration of capacitor properties.

SUMMARY OF THE INVENTION

An object of the present invention is to provide a conductive paste for forming external electrodes of a ceramic chip part, in which the reactivity of the glass frit with a ceramic material is suppressed. The conductive paste is capable of producing a ceramic chip part that has less internal defects such as delamination, has a high adhesion strength of the external electrodes thus formed, and is less apt to break after mounted on a circuit board when the circuit board is warped.

Another object of the present invention is to provide a ceramic chip part produced by using the conductive paste.

Other objects and effects of the present invention will be apparent from the following description.

The present inventors have made intensive investigations to eliminate the prior art problems, and as a result, have found that the above objects can be attained by using the conductive paste of the present invention, which is for preparing an external electrode of a ceramic chip part, comprising a glass frit containing PbO, $B_{2O3}$, and $SiO_2$ as major components and further containing from 1 to 20 wt % of at least one of $TiO_2$ and $Al_2O_3$.

The present invention relates to a conductive paste for producing an external electrode of a ceramic chip part, the conductive paste comprising powder of a conductive material, a glass frit, and an organic vehicle, the glass frit containing PbO, $B_2O_3$, and $SiO_2$ as major components and further containing from 1 to 20 wt % of at least one of $TiO_2$ and $Al_2O_3$.

The present invention also relates to a multilayer ceramic capacitor comprising internal electrode layers separated by dielectric ceramic layers and an external electrode connected to the internal electrodes, the external electrode comprising a conductive material and a glass frit containing PbO, $B_2O_3$, and $SiO_2$ as major components and further contains from 1 to 20 wt % of at least one of $TiO_2$ and $Al_2O_3$.

In the multilayer ceramic capacitor above, the dielectric ceramic layers preferably contain lead oxide.

DETAILED DESCRIPTION OF THE INVENTION

Figure 1:
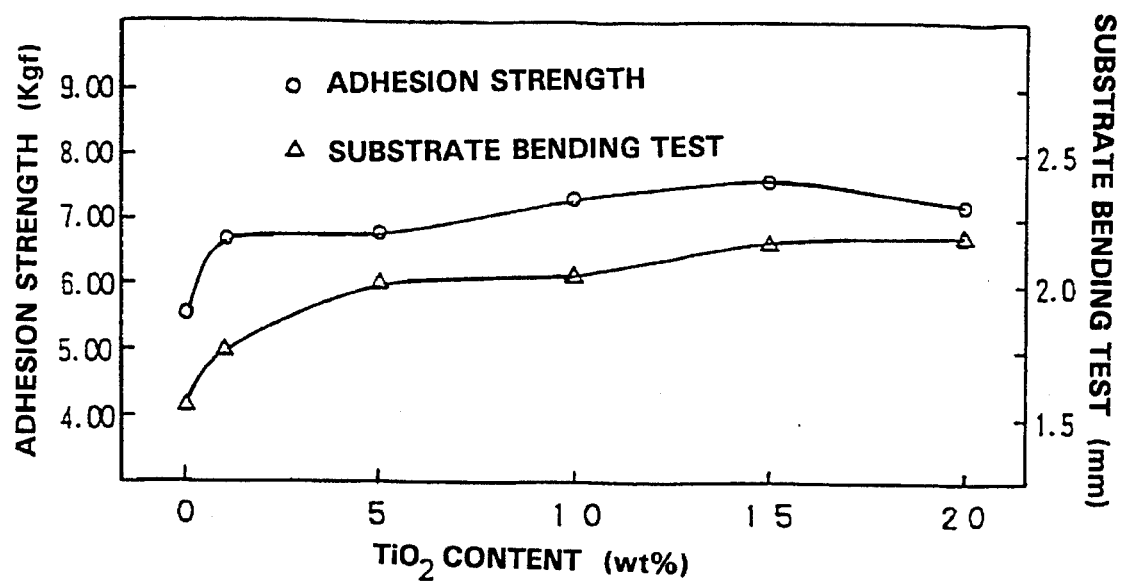
FIG. 1 is a graph showing the relationships between the $TiO_2$ amount in the glass frits and the chip part performance of the samples produced in Example and Comparative Example.

The conductive material used in the conductive paste according to the present invention and its properties are not particularly limited, and conventional conductive material such as powder of Ag, Cu, etc. can be used in the present invention.

The glass frit used in the conductive paste according to the present invention contains PbO, $B_2O_3$, and $SiO_2$ as major components and further contains from 1 to 20 wt %, preferably from 7.5 to 15 wt %, of at least one of $TiO_2$ and $Al_2O_3$. The proportion of $TiO_2$ and $Al_2O_3$ is not particularly limited.

If the amount of $TiO_2$ and/or $Al_2O_3$ is smaller than 1 wt %, no effect is produced by the addition of $TiO_2$ and/or $Al_2O_3$. If the amount thereof exceeds 20 wt %, the performance of the ceramic chip part cannot be enhanced any more because the values of the performance has been reached to their highest levels.

The amounts and proportions of the major components, i.e., PbO, $B_2O_3$, and $SiO_2$, are not particularly limited and may be appropriately determined depending on the end use of the ceramic chip part. In general, their amounts are from 25 to 90 wt % for PbO, from 5 to 30 wt % for $B_2O_3$, and from 0 to 30 wt % for $SiO_2$.

In the conductive paste according to the present invention, the ratio of the amount of the conductive material to the amount of the glass frit is generally from 80/20 to 99/1 by weight, and preferably from 94/6 to 98/2 by weight.

The organic vehicle used in the conductive paste of according to the present invention is not particularly limited and conventional organic vehicles can be used in the present invention. Examples thereof include an acrylic resin and an ethylcellulose diluted with terpenes such as α-terpineol, β-terpineol or a mixture thereof with other solvents such as kerosine, butyl carbitol, butyl carbitol acetate and high boiling alcohols and alcohol esters.

In the conductive paste of the present invention, the content of the organic vehicle is generally from 20 to 50 wt %, and the total content of the conductive material and the glass frit is generally from 50 to 75 wt %.

The conductive paste of the present invention can be produced in any conventional manner for preparing conductive pastes. For example, a conductive material and a glass frit, which have been separately prepared, are mixed, and the resulting mixture is kneaded with an organic vehicle to form a conductive paste according to the present invention.

The conductive paste of the present invention can be used in the similar manner as in conventional conductive pastes. For example, the conductive paste can be applied to a ceramic chip body for preparing an external electrode to produce a ceramic chip part, e.g., a multilayer ceramic capacitor, a ceramic coil chip (L chip), a composite ceramic chip containing coil, capacitor and resistor (LCR chip). The conductive paste can also be printed on a suitable base, such as a ceramic base, by screen printing to form a circuit and the like. The applied or printed conductive paste can be dried, e.g., at 150° C. for 10 minutes, and then baked, e.g., at 650° C. in the air.

The multilayer ceramic capacitor according to the present invention has an external electrode comprising a conductive material and a glass frit containing PbO, $B_2O_3$, and $SiO_2$ as major components and further contains 1 to 20 wt % of at least one of $TiO_2$ and $Al_2O_3$, which can be produced by applying the conductive paste of the present invention to a ceramic chip body, followed by baking.

The ceramic chip body comprising internal electrode layers separated by dielectric ceramic layers, to which the conductive paste of the present invention is applied to provide an external electrode, is not particularly limited and any conventional ceramic chip intermediate for producing a multilayer ceramic capacitor can be used.

The internal electrode layer may comprise palladium or a palladium-silver alloy.

The dielectric ceramic layer may comprise $BaTiO_3$ (barium titanate) series ceramics, perovskite ceramic materials containing $PbTiO_3$, or related systems. In the present invention, the dielectric ceramic layer preferably contain lead oxide because the effect of the present invention, i.e., suppressing the reactivity of the glass frit with the ceramic material, becomes remarkable when the ceramic material of this type is used.

The dimensions of the ceramic chip body, the thicknesses of the internal electrode layer and the dielectric ceramic layer, and the dimensions and forms of the external electrode are not particularly limited and can be appropriately determined depending on the end use of the multilayer ceramic capacitor.

When the conductive paste of the present invention is applied and baked on a ceramic chip body, the glass frit contained in the conductive paste shows reduced reactivity with the ceramic material containing lead oxide as a major component. Consequently, the ceramic material is prevented from being excessively denatured, so that it neither loses its inherent properties is deteriorated by the penetration of a plating liquid.

The present invention will be described in more detail by referring to the following Examples and Comparative Examples, but is not construed as being limited thereto.

EXAMPLE AND COMPARATIVE EXAMPLE

Fifteen kinds of glass frits shown in Table 1 were produced. $Pb_3O_4$, $H_3BO_4$, $SiO_2$, $TiO_2$, and $Al(OH)_3$, as starting materials for the glass frit, were mixed in such proportions as to result in the glass frit compositions shown in Table 1. Each mixture was melted at an elevated temperature and then quenched to vitrify the mixture. The thus-obtained glasses were pulverized to obtain glass frits. Sample Nos. 1 to 14 were the samples according to the present invention and Sample No. 15 was a comparative sample.

TABLE 1

| Sample No. | Glass frit composition | | | | |
| --- | --- | --- | --- | --- | --- |
| | PbO (wt %) | $B_2O_3$ (wt %) | $SiO_2$ (wt %) | $TiO_2$ (wt %) | $Al_2O_3$ (wt %) |
| 1 | 82.5 | 11.0 | 5.5 | 1.0 | 0 |
| 2 | 79.2 | 10.5 | 5.3 | 5.0 | 0 |
| 3 | 75.0 | 10.0 | 5.0 | 10.0 | 0 |
| 4 | 70.8 | 9.5 | 4.7 | 15.0 | 0 |
| 5 | 66.7 | 8.9 | 4.4 | 20.0 | 0 |
| 6 | 82.5 | 11.0 | 5.5 | 0 | 1.0 |
| 7 | 79.2 | 10.5 | 5.3 | 0 | 5.0 |
| 8 | 75.0 | 10.0 | 5.0 | 0 | 10.0 |
| 9 | 70.8 | 9.5 | 4.7 | 0 | 15.0 |
| 10 | 66.7 | 8.9 | 4.4 | 0 | 20.0 |
| 11 | 75.0 | 10.0 | 5.0 | 8.0 | 2.0 |
| 12 | 75.0 | 10.0 | 5.0 | 6.0 | 4.0 |
| 13 | 75.0 | 10.0 | 5.0 | 4.0 | 6.0 |
| 14 | 75.0 | 10.0 | 5.0 | 2.0 | 8.0 |
| 15* | 83.3 | 11.1 | 5.6 | 0 | 0 |

Note:
*Sample No. 15 was a comparative sample and the others were samples according to the present invention.

Fifteen kinds of conductive pastes were then prepared respectively from these glass frits, by mixing 66 wt % of Ag powder as a conductive material with 5 wt % of the glass frit and 29 wt % of an organic vehicle obtained by dissolving an ethyl cellulose resin in butyl cellosolve and then kneading the mixture on a three-roll mill to disperse the conductive material and the glass frit.

A multilayer ceramic capacitor body produced beforehand, dielectric ceramic layers of which had been produced by using lead oxide as a starting material, was then coated on its exposed edges of the internal electrode layers with each of the conductive pastes obtained above. The coated conductive paste was dried and baked in the air at 650° C. to form a conductive film. Thereafter, the surface of the conductive film was plated with Ni and then Sn to form external electrodes.

The fifteen kinds of multilayer ceramic capacitors thus produced were subjected to a substrate bending test and a test for measuring external-electrode adhesion strength.

The substrate bending test was performed in accordance with JIS C6429, Appendix 2. Each multilayer ceramic capacitor produced was soldered to a 1.6 mm-thick copper-clad laminate containing an epoxy resin-impregnated glass cloth. The copper-clad laminate to which the multilayer ceramic capacitor had been thus attached was warped by pushing the laminate on the side opposite to the capacitor by means of a pressure rod, and the degree of warpage at which the multilayer ceramic capacitor began to break was measured; this value of the degree of warpage was taken as the substrate bending test.

The external-electrode adhesion strength was measured in such a manner that a lead wire was soldered to each of the two external electrodes of the multilayer ceramic capacitor, and the lead wires were stretched at a constant rate in the axial direction to measure the strength at break, which strength was taken as the adhesion strength of the external electrodes.

FIG. 1 shows the results of these tests for measuring external-electrode adhesion strength and substrate bending test for the multilayer ceramic capacitor having external electrodes formed from the conductive paste containing a glass frit containing neither $TiO_2$ nor $Al_2O_3$ (Sample No. 15) and for the multilayer ceramic capacitors having external electrodes formed from the conductive pastes containing glass frits containing $TiO_2$ (Samples Nos. 2 to 5). The number of specimens for each sample was 20.

Figure 2:
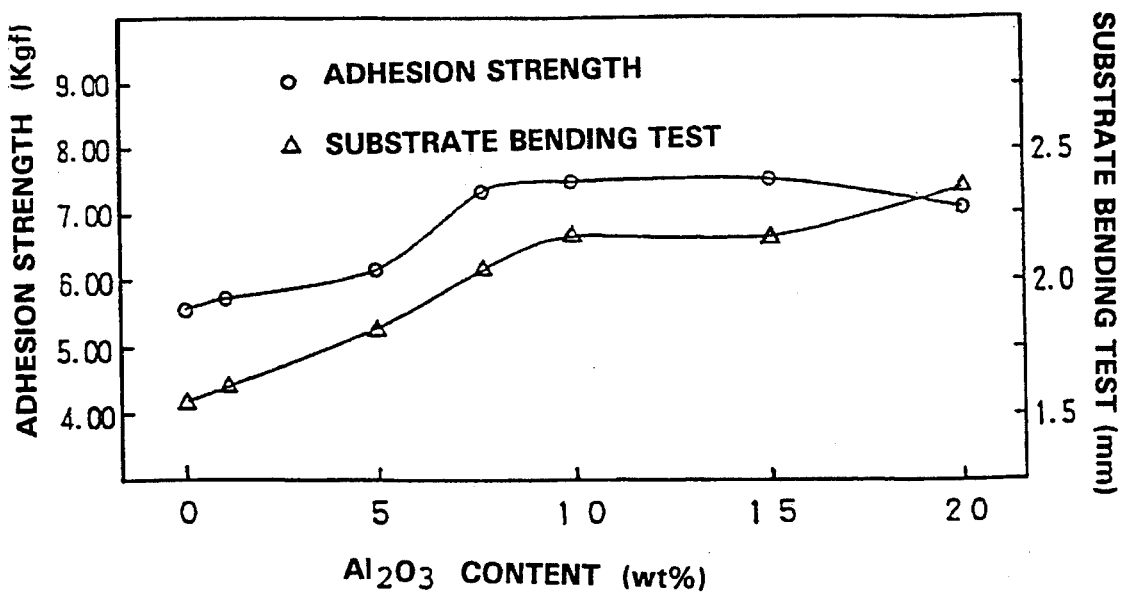
FIG. 2 is a graph showing the relationships between the $Al_2O_3$ amount in the glass frits and the chip part performance of the samples produced in Example and Comparative Example.

FIG. 2 likewise shows the results of these tests for measuring external-electrode adhesion strength and substrate bending test for the multilayer ceramic capacitor having external electrodes formed from the conductive paste containing a glass frit containing neither $TiO_2$ nor $Al_2O_3$ (Sample No. 15) and for the multilayer ceramic capacitors having external electrodes formed from the conductive pastes containing glass frits containing $Al_2O_3$ (Samples Nos. 6 to 10). The number of specimens for each sample was 20.

Figure 3:
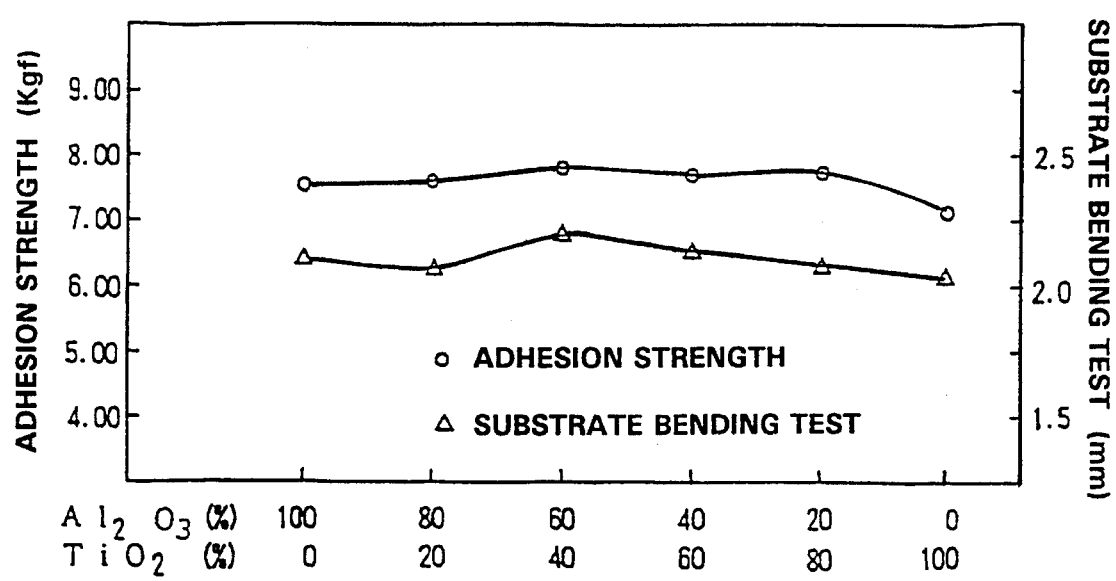
FIG. 3 is a graph showing the relationships between the $Al_2O_3/TiO_2$ proportion in the glass frit and the chip part performance of the samples produced in Example and Comparative Example.
Figure 4:
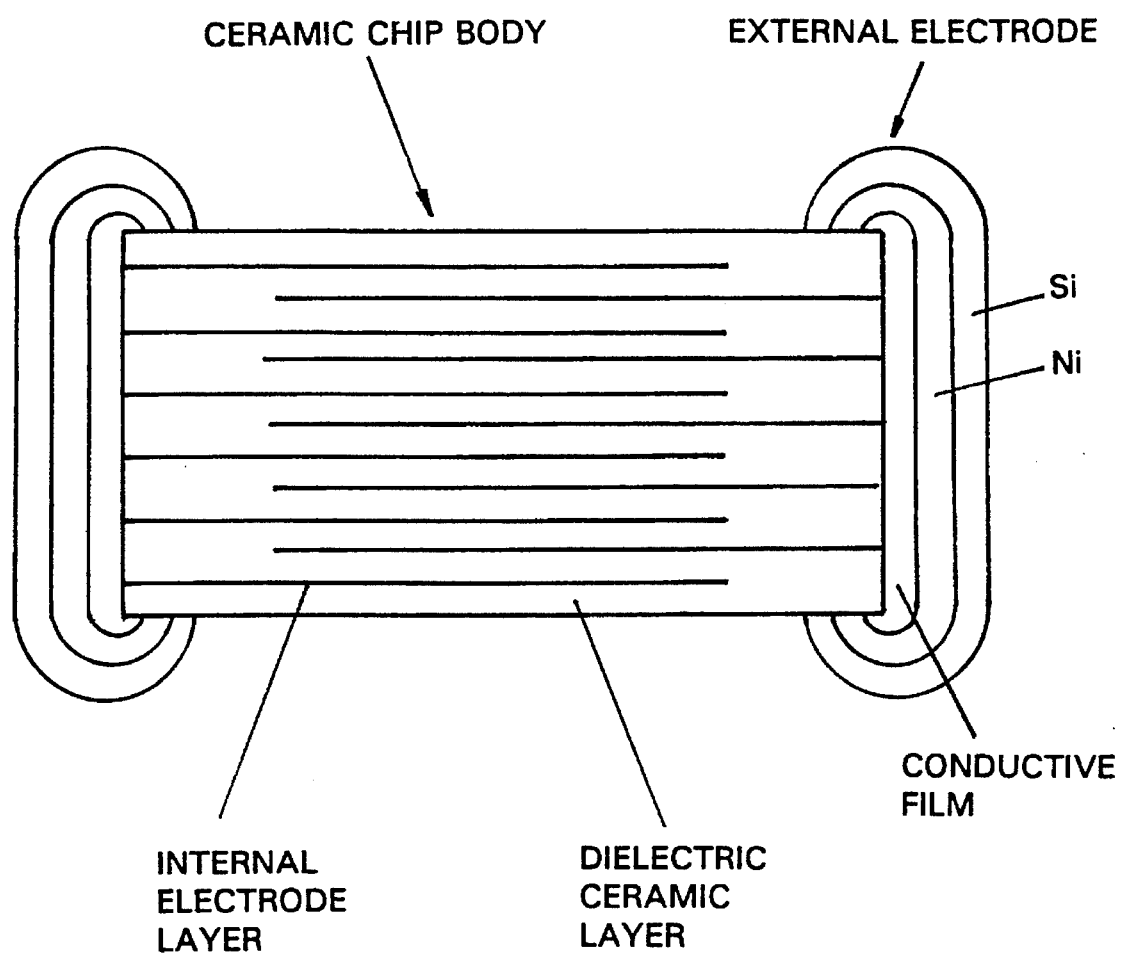
FIG. 4 is a cross-section of a chip part according to the present invention.

FIG. 3 shows the relationships between external-electrode adhesion strength and substrate bending test in the multilayer ceramic capacitors having external electrodes formed from the conductive pastes containing glass frits containing both $TiO_2$ and $Al_2O_3$ (Samples Nos. 11 to 14). The number of specimens for each sample was 10.

As FIGS. 1 to 3 show, the multilayer ceramic capacitors having external electrodes formed from the conductive pastes of the present invention are superior in results of both the external-electrode adhesion strength and the substrate bending test to the multilayer ceramic capacitor having external electrodes formed from the conductive paste containing a glass frit containing neither $TiO_2$ nor $Al_2O_3$. If the amount of $TiO_2$ and/or $Al_2O_3$ is smaller than 1 wt %, no effect is produced by the addition of $TiO_2$ and/or $Al_2O_3$. If the amount thereof exceeds 20 wt %, the results of the external-electrode adhesion strength and the substrate bending test cannot be enhanced any more because the values of these properties have already been reached to their highest levels.

The multilayer ceramic capacitors having external electrodes formed from the conductive pastes respectively containing glass frit samples Nos. 3, 8, and 15 were examined for delamination, i.e., 30,000 specimens for each multilayer ceramic capacitor were prepared and the number of specimens in which delamination occurred was counted. The results obtained are given in Table 2.

TABLE 2

| Sample No. | Number of specimens having delamination defect |
| --- | --- |
| 3 | 0 |
| 8 | 0 |
| 15* | 7 |

Note:
Sample No. 15 is a comparative sample and the others are samples according to the present invention.
Number of specimens to be examined: 30,000

As Table 2 shows, the multilayer ceramic capacitors having external electrodes formed from the conductive pastes according to the present invention are less apt to suffer delamination than the capacitor having external electrodes formed from the conventional conductive paste containing neither $TiO_2$ nor $Al_2O_3$.

Although application of the conductive paste of the invention to multilayer ceramic capacitors has been described in the above Example, it is a matter of course that the conductive paste of this invention produces the same effects when used in forming external electrodes of other ceramic chip parts, e.g., L chips and LCR chips.

It should be further noted that although $Pb_3O_4$, $H_3BO_4$, $SiO_2$, $TiO_2$, and $Al(OH)_3$ were used as starting materials for glass frits in the above Example, usable starting materials are not limited thereto. Specifically, in place of $Pb_3O_4$, a known lead compound may be used such as, for example, a lead oxide, e.g., PbO or $Pb_2O_3$, $PbCO_3$, $Pb(OH)_2$, or a lead salt of an organic acid. In place of $H_3BO_4$, a known boron compound may be used such as, for example, a boron oxide, e.g., $B_2O_3$ or BO, or $(HBO_2)_x$. In place of $SiO_2$, a known silicon compound may be used such as, for example, a silicon oxide, e.g., SiO, a silicon boride, e.g., $SiB_3$ or $SiB_6$, or a compound of silicon with an organic acid. In place of $TiO_2$, a known titanium compound may be used such as, for example, a titanium oxide, e.g., $Ti_2O_3$, a titanate, e.g., $PbTiO_3$, a titanium salt of an organic acid, e.g., $Ti_2(CO_4)_3$, or a titanium hydroxide, e.g., $Ti(OH)_2$. In place of $Al(OH)_3$, a known aluminum compound may be used such as, for example, an aluminum oxide, e.g., $Al_2O_3$, a compound of aluminum with an organic acid, or an aluminum alkoxide.

As apparent from the above description, when the conductive paste of the present invention is used to form the external electrodes of a ceramic chip part, the glass frit contained in the conductive paste is inhibited from reacting with the ceramic material. Therefore, a high-quality ceramic chip part can be obtained which is less apt to suffer internal defects such as delamination, has high adhesion strength of the external electrodes formed, and is less apt to break after being mounted on a circuit board when the circuit board is warped.

While the invention has been described in detail and with reference to specific examples thereof, it will be apparent to one skilled in the art that various changes and modifications can be made therein without departing from the spirit and scope thereof.

What is claimed is:

1. A conductive paste for producing an external electrode of a ceramic chip part, said conductive paste comprising a conductive material powder, a glass frit, and an organic vehicle, said glass frit consisting essentially of PbO, $B_2O_3$, and $SiO_2$ as major components and from 1 to 20 wt % of a member selected from the group consisting of (a) $TiO_2$ and (b) a combination of $TiO_2$ and $Al_2O_3$.

2. A conductive paste according to claim 1, wherein the amount of said at least one member is 7.5 to 15 wt %.

3. A conductive paste according to claim 2, wherein said glass frit contains from 25 to 90 wt % of PbO, from 5 to 30 wt % of $B_2O_3$ and up to 30 wt % of $SiO_2$.

4. A conductive paste according to claim 1, wherein said glass frit contains from 25 to 90 wt % of PbO, from 5 to 30 wt % of $B_2O_3$ and up to 30 wt % of $SiO_2$.

5. A conductive paste as claimed in claim 1, wherein said member of the group is $TiO_2$.

6. A conductive paste as claimed in claim 1, wherein said member of the group is a combination of $TiO_2$ and $Al_2O_3$.

7. A multilayer ceramic capacitor comprising an internal electrode layers separated by dielectric ceramic layers and an external electrode connected to said internal electrodes, said external electrode comprising a conductive material and a glass frit consisting essentially of PbO, $B_2O_3$, and $SiO_2$ as major components and 1 to 20 wt % of a member selected from the group consisting of $TiO_2$ and (b) a combination of $TiO_2$ and $Al_2O_3$.

8. A multilayer ceramic capacitor as claimed in claim 7, wherein said dielectric ceramic layers contain lead oxide.

9. A multilayer ceramic capacitor as claimed in claim 8, wherein the amount of said member is 7.5 to 15 wt %.

10. A multilayer ceramic capacitor as claimed in claim 9, wherein said glass frit contains from 25 to 90 wt % of PbO, from 5 to 30 wt % of $B_2O_3$ and up to 30 wt % of $SiO_2$.

11. A multilayer ceramic capacitor as claimed in claim 9, wherein said member of the group is $TiO_2$.

12. A multilayer ceramic capacitor as claimed in claim 9, wherein said member of the group is a combination of $TiO_2$ and $Al_2O_3$.

13. A multilayer ceramic capacitor as claimed in claim 7, wherein said member of the group is $TiO_2$.

14. A multilayer ceramic capacitor as claimed in claim 7, wherein said member of the group is a combination of $TiO_2$ and $Al_2O_3$.

15. A multilayer ceramic capacitor as claimed in claim 7, wherein the amount of said at least one member is 7.5 to 15 wt %.

16. A multilayer ceramic capacitor as claimed in claim 7, wherein said glass frit contains from 25 to 90 wt % of PbO, from 5 to 30 wt % of $B_2O_3$ and up to 30 wt % of $SiO_2$.

\* \* \* \* \*